E. B. & G. P. BALCOM.
SEED GERMINATOR.
APPLICATION FILED MAR. 23, 1910.

978,812.

Patented Dec. 13, 1910.
2 SHEETS—SHEET 1.

Witnesses

Inventors
Ebenezer B. Balcom
George P. Balcom
By Victor J. Evans
Attorney

E. B. & G. P. BALCOM.
SEED GERMINATOR.
APPLICATION FILED MAR. 23, 1910.
978,812.
Patented Dec. 13, 1910.
2 SHEETS—SHEET 2.
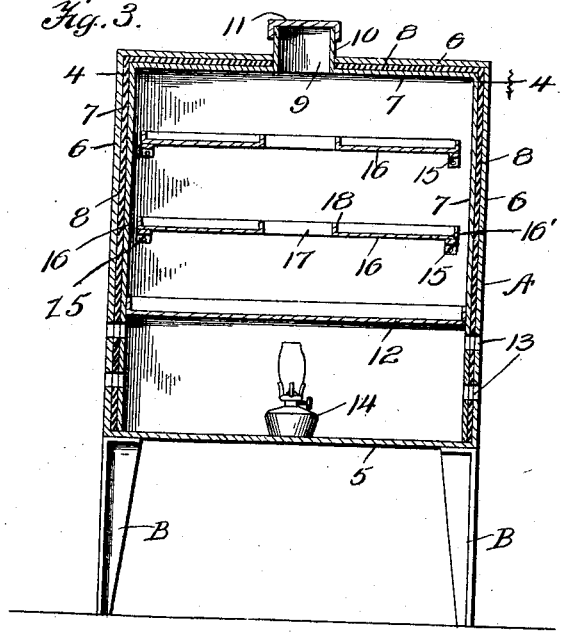
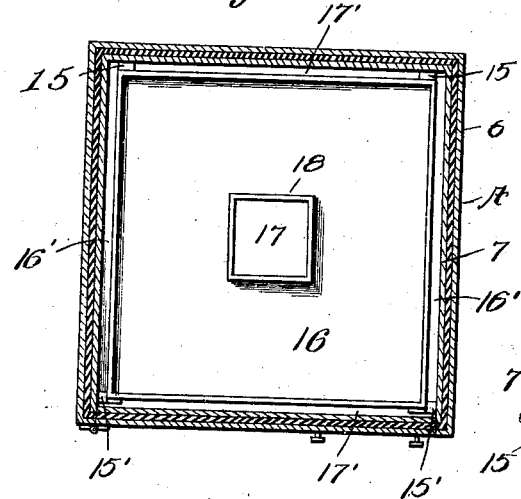
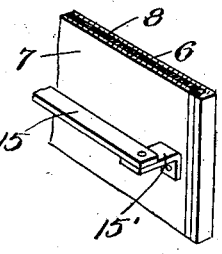
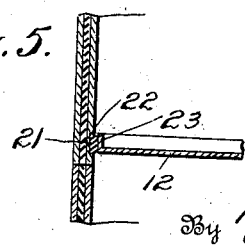
Inventor
Ebenezer B Balcom
George P Balcom
By Victor J Evans
Attorney

UNITED STATES PATENT OFFICE.

EBENEZER B. BALCOM, OF MILWAUKEE, WISCONSIN, AND GEORGE P. BALCOM, OF HOUGHTON, MICHIGAN.

SEED-GERMINATOR.

978,812.  Specification of Letters Patent.  Patented Dec. 13, 1910.

Application filed March 23, 1910. Serial No. 551,052.

*To all whom it may concern:*

Be it known that we, EBENEZER B. BALCOM and GEORGE P. BALCOM, citizens of the United States of America, residing at Milwaukee and Houghton, respectively, in the counties of Milwaukee and Houghton, respectively, and States of Wisconsin and Michigan, respectively, have invented new and useful Improvements in Seed-Germinators, of which the following is a specification.

This invention relates to seed germinators.

It has been found that in feeding seed, such as oats, barley and the like to poultry, much superior results are attained if the seeds thus fed are previously caused to sprout or germinate, the nutritious value being thereby greatly increased.

The principal object of the present invention is to produce a simple and efficient device, whereby seeds may be thus sprouted or germinated in sufficient quantities simply and inexpensively and with very little trouble.

Further objects of the invention are to simplify and improve the construction and operation of a device of the character outlined above.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
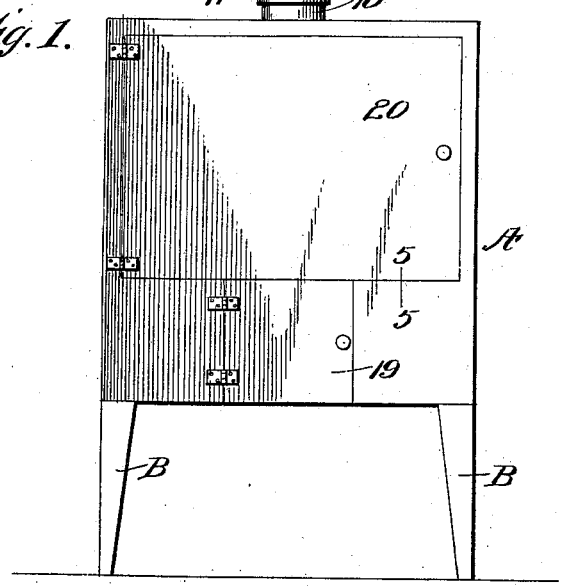
Figure 2:
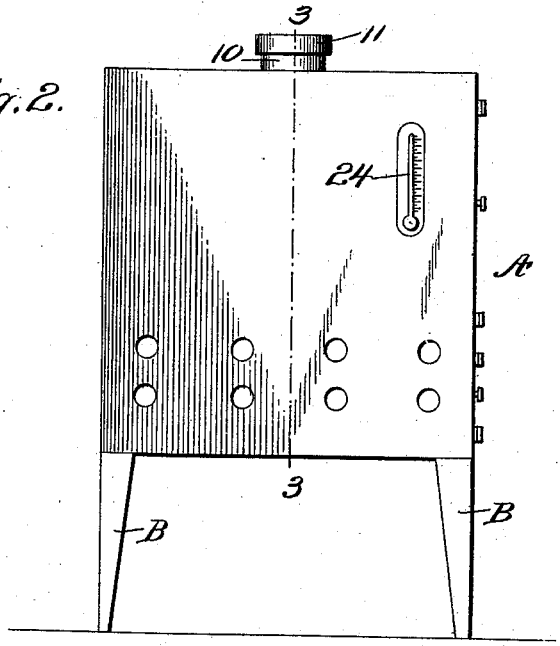

In the drawings,—Figure 1 is a front view of a seed germinator constructed in accordance with the invention. Fig. 2 is a side elevation of the same. Fig. 3 is a vertical transverse sectional view taken on the plane indicated by the line 3—3 in Fig. 2. Fig. 4 is a horizontal sectional view taken on the plane indicated by the line 4—4 in Fig. 3. Fig. 5 is a sectional detail view taken on the plane indicated by the line 5—5 in Fig. 1. Fig. 6 is a perspective detail view, showing a portion of one side of the casing.

Corresponding parts in the several figures are denoted by like characters of reference.

The improved seed germinator consists of a box or casing A which is supported upon legs B whereby it is raised to a suitable elevation. The box or casing A which may be of any desired size and shape is provided with a flat bottom 5 which may be constructed of wood or metal, but the side walls and the top of the casing are each preferably constructed of an outer sheathing 6 of wood, an inner lining 7 of zinc or other sheet metal and an intermediate layer 8 of asbestos paper or other non-conductive material. The top of the casing is provided with a vent opening 9 surrounded by a flange or pipe 10 having a cap or closure 11 which may be readily detached when desired.

Permanently arranged within the casing a suitable distance above the bottom 5 is a partition which is in the form of a metallic tray 12 which is permanently secured within the casing and which is made perfectly water tight. The side walls of the casing, below the tray or partition 12, are provided with apertures 13 which are partly for the purpose of supplying air to support combustion for a lamp or heater 14 which is placed upon the bottom 5 and partly for the purpose of permitting escape of the products of combustion. Interiorly upon the side walls of the casing are placed cleats 15 to support drawers 16 each of which has a central aperture 17 surrounded by an upstanding flange 18.

The front wall of the box or casing is provided with doors 19 and 20; the former to afford access to the heater compartment below the water tray 12, while the door 20 affords access to the upper compartment containing the drawers 16. It is obvious that the said upper compartment may be made to contain any desired number of drawers, and that, generally speaking, the dimensions as well as the shape may be varied from those herein shown.

The drawer supporting cleats 15 are preferably spaced from the sides of the casing, the rear ends of said cleats being attached directly to the inner faces of the back wall, while the forward ends of said cleats are supported upon brackets 15' projecting from the inner faces of the side walls of the casing; an open space will thus be left between the cleats and the side walls, as well as between the side walls and the adjacent sides of the drawers 16 through which moisture-laden air may circulate within the casing, such spaces being indicated at 16' in the drawings, Figs. 3 and 4. In like manner the drawers are made of such dimensions that separating spaces 17', seen in Fig. 4, will be left between the drawers and the front and rear parts of the casing.

The operation of this invention will be very obvious from the foregoing description, taken in connection with the drawings hereto annexed. Water is placed in the tray 12, and the seeds that are to be sprouted or germinated are placed upon the drawers 16, after which the lamp or heater is lighted and the doors shut. The water being heated will become vaporized and the seeds being subjected to the action of the moisture-laden heated air will speedily sprout or germinate.

It will be observed that the seed containing compartment is entirely isolated from the heater containing compartment, and the seeds will thus be protected against injury from the fumes of oil or other fuel, as well as from the smoke rising from the heater. To insure absolute separation between the upper and lower compartments it may be found advisable to provide the inner faces of the door 20 adjacent to the lower edge of said door with a dovetailed groove 21 wherein is placed a packing strip 22 of asbestos, felt or other suitable material to abut upon the front wall 23 of the water tray 12 when the door 20 is closed, thus effecting a perfectly tight closure, whereby the upper and lower compartments of the casing are distinctly separated.

A thermometer 24 has been shown suitably arranged in one of the side walls of the casing for the purpose of indicating the temperature.

The apertures 17 in the drawers 16 will permit free circulation of the heated and moisture-laden air within the seed compartment of the casing, and any excess of vapor may be permitted to escape through the outlet 9 by temporarily removing the cap 11.

Having thus described the invention, what is claimed as new, is:—

In a device of the character described, a casing having side walls and a top, each composed of an outer sheathing, an inner metallic lining and an intermediate layer of non-conducting material, a horizontal partition consisting of a water tray, cleats upon the inner faces of the side walls above said compartment, seed receptacles supported upon said cleats, said receptacles having apertures surrounded by upstanding flanges, and a heater supported in the compartment below the water tray, the side walls of the casing below said water tray being provided with apertures.

In testimony whereof we affix our signatures in presence of two witnesses.

EBENEZER B. BALCOM.
GEORGE P. BALCOM.

Witnesses as to the signature of Ebenezer B. Balcom:
  E. G. COMSTOCK,
  F. W. DOBIMSKI.

Witnesses as to the signature of George P. Balcom:
  WALLACE TEDFORD,
  WILL. SONGTINE.